United States Patent
Geaghan (10) Patent No.: US 8,159,472 B2
(45) Date of Patent: *Apr. 17, 2012

(54) TOUCH SCREEN WITH SELECTIVE TOUCH SOURCES

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 805 days.

This patent is subject to a terminal disclaimer.

(21) Appl. No.: 12/254,339

(22) Filed: Oct. 20, 2008

(65) Prior Publication Data

US 2009/0040193 A1 Feb. 12, 2009

Related U.S. Application Data (63) Continuation of application No. 11/179,185, filed on Jul. 12, 2005, now Pat. No. 7,453,444, which is a continuation of application No. 10/052,695, filed on Jan. 18, 2002, now abandoned.

(60) Provisional application No. 60/304,007, filed on Jul. 9, 2001.

(51) Int. Cl.
G06F 3/045 (2006.01)
(52) U.S. Cl. .......... 345/174; 345/173
(58) Field of Classification Search ........... 345/156–173
See application file for complete search history.

(56) References Cited

U.S. PATENT DOCUMENTS

| | | | |
|---|---|---|---|
| 4,071,691 A | 1/1978 | Pepper, Jr. | |
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,686,332 A | 8/1987 | Greanias et al. | |
| 4,707,845 A | 11/1987 | Krein et al. | |
| 5,153,572 A | 10/1992 | Caldwell et al. | |
| 5,365,461 A | 11/1994 | Stein et al. | |
| 5,402,151 A | 3/1995 | Duwaer | |
| 5,484,967 A | 1/1996 | Yanagisawa et al. | |
| 5,589,856 A | 12/1996 | Stein et al. | |
| 5,815,141 A | 9/1998 | Phares | |
| 5,943,043 A | 8/1999 | Furuhata et al. | |
| 6,118,435 A | 9/2000 | Fujita et al. | |
| 6,163,313 A | 12/2000 | Aroyan et al. | |
| 6,225,985 B1 | 5/2001 | Armstrong et al. | |
| 6,236,391 B1 | 5/2001 | Kent et al. | |
| 6,246,395 B1 | 6/2001 | Goyins et al. | |
| 6,255,604 B1 | 7/2001 | Tokioka et al. | |
| 6,400,359 B1 | 6/2002 | Katabami | |
| 6,498,590 B1 * | 12/2002 | Dietz et al. ........... | 343/893 |
| 6,650,345 B1 * | 11/2003 | Saito et al. .......... | 715/764 |
| 7,453,444 B2 * | 11/2008 | Geaghan ............. | 345/173 |

(Continued)

FOREIGN PATENT DOCUMENTS

CN 11-24390 6/1996

(Continued)

OTHER PUBLICATIONS

Mitsubishi Electric Research Labs, "Group Touch", Technology Review, Jan./Feb. 2202, p. 16.

(Continued)

*Primary Examiner* — Nitin Patel
(74) *Attorney, Agent, or Firm* — C. Michael Geise; Steven A. Bern (57) ABSTRACT

A data processor for an occupant identification system.

8 Claims, 5 Drawing Sheets

U.S. PATENT DOCUMENTS

| | | |
|---|---|---|
| 2002/0149571 A1 | 10/2002 | Roberts |
| 2004/0158374 A1 | 8/2004 | Suzuki |

FOREIGN PATENT DOCUMENTS

| | | |
|---|---|---|
| EP | 0 414 566 A2 | 2/1991 |
| GB | 2 332 524 | 6/1999 |
| JP | 01-269120 | 10/1989 |
| JP | 07-103778 | 4/1995 |
| JP | 08-083144 | 3/1996 |
| JP | 08-190453 | 7/1996 |
| JP | 08-241161 | 9/1996 |
| JP | 9-109802 | 4/1997 |
| JP | 09-292261 | 11/1997 |
| JP | 09-292952 | 11/1997 |
| JP | 09-325851 | 12/1997 |
| JP | 11-248466 | 9/1999 |
| JP | 11-312053 | 11/1999 |
| JP | 2000-010733 | 1/2000 |
| JP | 2000-076014 | 3/2000 |
| JP | 2000-148396 | 5/2000 |
| JP | 2000-329577 | 11/2000 |

OTHER PUBLICATIONS

IntelliTouch/SecureTouch/iTouch Surface Wave Touchscreens, *A Technical Comparison with Other Technologies*, ELO TouchSytems, Inc., 1999-2001 [from internet on Oct. 1, 2001], URL www.elotouch.com/products/inteltec/inteltecm.asp.

Itouch Surface Wave Tedhnology, "Touch-on-Tube"*Technology-A Breakthrough for Gaming and Amusement Machines*, ELO TouchSystems, Inc., Sep. 2001.

* cited by examiner

FIG. 9

TOUCH SCREEN WITH SELECTIVE TOUCH SOURCES

This application is a continuation of U.S. patent application Ser. No. 11/179,185, filed Jul. 12, 2005, now U.S. Pat. No. 7,453,444, which is a continuation of U.S. patent application Ser. No. 10/052,695, filed Jan. 18, 2002 now abandoned, which claims the benefit of U.S. Provisional Application 60/304,007 filed Jul. 9, 2001, each of which are hereby incorporated in their entirety.

FIELD OF INVENTION

This invention relates to a processor. The invention more particularly relates to a processor that, in some embodiments, utilizes information from a touch sensor and a contact point in order to provide output for determining the position of a touch to the touch sensor.

BACKGROUND OF INVENTION

Touch screens are capable of measuring touch position for a single touched point. Current touch screens are unable to effectively determine the position of touches by multiple users, discriminate among touches by multiple users, or enable the touch of one user while disabling the touch of another, especially when simultaneous touch down occurs. A number of touch screen applications would benefit from the ability to determine the position of multiple touches to a touch screen, discriminate among touches by multiple users and to enable touches by one user and not another.

Infrared and surface acoustic wave touch screen systems have the ability to locate two separate simultaneous touches in two of four possible locations, but they are unable to resolve the locations uniquely due to "shadow" effect. A capacitive touch system with the ability to discriminate between human touch and the simultaneous use of an inanimate object (a stylus) is disclosed in U.S. Pat. No. 5,365,461 by Stein et al. The system is an improvement of the definite capacitive disclosures in U.S. Pat. Nos. 4,371,746, 4,293,734, 4,198,539, and 4,071,691 to Pepper, Jr. These capacitive systems lack the ability to measure coordinates of two simultaneous human touches because the current flowing through the touch screen from each touch are combined, and the measured result indicates an average of two touch locations. A touch system addressing disadvantages of known touch systems and their components would be an important advance in the art.

SUMMARY OF THE INVENTION

The present invention relates to systems and methods of distinguishing different users of a touch screen system. In a particular embodiment, the present invention provides a vehicle touch screen system that includes a touch sensor accessible from a driver position and a passenger position, a first contact point driven with a first signal and associated with the driver position, a second contact point driven with a second signal and associated with the passenger position, and a processor configured to discern users in the driver position touching the touch sensor from users in the passenger position touching the touch sensor based on detection of the first or second signals on the touch sensor. In one example, the contact points can be embedded in the driver and passenger seats.

Vehicles systems of the present invention can be used to disable touch inputs from the driver while the vehicle is in motion, still allowing the passenger to interact with the system. For example, in a method of the present invention involves providing a touch sensor accessible from a driver position and a passenger position, distinguishing touch inputs by users in the driver position from touch inputs by users in the passenger position, disabling touch inputs from users in the driver position when the vehicle is in motion, and allowing touch inputs from users in the passenger position regardless of whether the vehicle is in motion. Distinguishing touch inputs by users in the driver position from touch inputs by users in the passenger position can involve driving a first user contact point associated with the driver position with a first signal, driving a second user contact point associated with the passenger position with a second signal, and detecting the presence of the first or second signal transferred by a touch input.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

While the invention is amenable to various modifications in alternative forms, the specifics thereof have been shown by way of example in the drawings and will be described in detail. It should be understood, however, that the intention is not to limit the invention of the particular embodiments described. On the contrary, the intention is to cover all modifications, equivalents, and alternatives falling within the spirit and scope of the invention.

DETAILED DESCRIPTION OF THE PREFERRED EMBODIMENTS

The present invention is generally applicable to touch screens or touch digitizers with selective touch sources. The invention is particularly related to a touch system having a touch sensor and a user contact point, where the system utilizes information from both the user contact point and a touch to the touch sensor to determine a location of a touch to the touch sensor. The invention may be particularly suited for use with a capacitive touch system where both the touch sensor and the user contact point are touched, which may additionally create enhanced performance of the touch system. The present invention may also be particularly suited for use in, for example, an electronic game system designed to be played by one or more players where, in the course of playing the game, players can apply touch input to generate a response in the game.

In a touch system, the location of a touch applied by a user is generally determined by measuring separate signals generated by a touch input to the system, and comparing the signals, or ratios of the signals, to calculate the position of the touch. The touch data then may be, for example, correlated to a particular action or instruction. Assuming a properly calibrated touch system, the calculated position of a touch should be sufficiently close to the actual touch location to be used for a particular action or instruction as a reported touch location. What qualifies as "sufficiently close" is determined in part by the resolution of the touch system. As used herein, reporting a touch location refers to the calculated touch location being used by the touch system in an appropriate manner, for example, by the application software, to determine the user input instructions. Reporting might include communications from a touch system processor to a central processing unit (CPU), or in a more integrated system can simply entail touch position data being calculated and appropriately used as contemplated by the application.

A "touch" to the touch sensor or to the contact point may include an actual physical touch, or may be defined as a proximity touch, wherein a touch signal is generated in the touch sensor or the contact point when a user or object is positioned sufficiently close to generate a signal.

As used herein, "information" related to a contact point and a touch sensor that is used to determine a position of a touch to the touch sensor may include several distinguishing characteristics and includes any suitable measurable or detectable parameter, quantity or property. For example, "information" may include the magnitude, frequency, or phase of a touch signal from a "touch" to the touch sensor or to the contact point. The "information" may also relate to the timing of touch down and lift off from a touch sensor or contact point or whether or not a "touch" is in an active or inactive area of a touch screen or contact surface for a given function of the touch system. Fundamentally, the "information" may include whether or not any "touch" has been made to a particular touch sensor or contact point.

Figure 1:
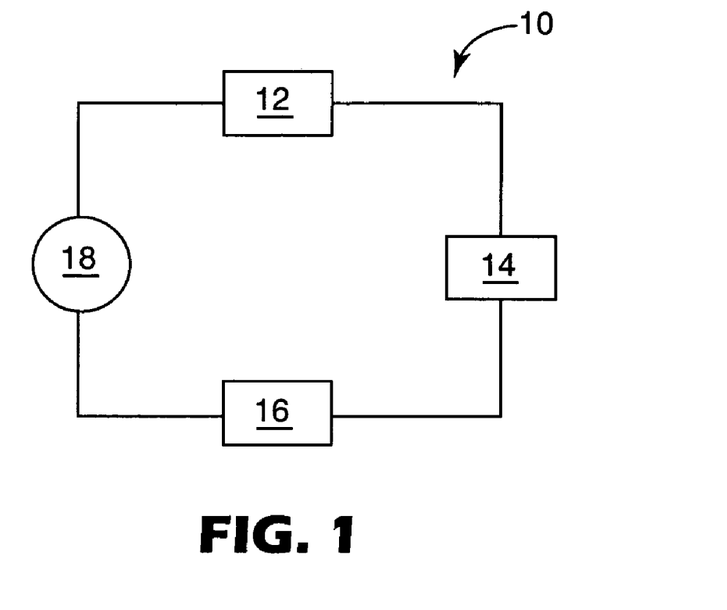
FIG. 1 is a schematic diagram including the primary features of a touch system, according to the invention.

Now referring to the schematic diagram of FIG. 1, one example of a touch system 10 of the present invention includes a touch sensor 12, a contact point 14, a processor 16 and a power source 18. The lines connecting these elements represent communication between the elements, for example through wires. Touch sensor 12 may be an infrared touch sensor, a force touch sensor (i.e., one that determines a touch position by measuring flex, strain, and/or displacement due to the force of a touch), a resistive touch sensor, a surface acoustic wave (SAW) touch sensor, a capacitive touch sensor or the like. The touch sensor may be transparent to allow interaction with an image, or it may be non-transparent as in the case of touch pads and digitizers. A capacitive touch system may include a touch sensor 12 that has a conductive surface, typically made by applying transparent Indium Tin Oxide (ITO) or Tin Antimony Oxide (TAO) onto a glass substrate. The conductive surface is then typically overcoated with a dielectric material. Touch sensor 12 may, in the alternative, be configured as a multiple electrode near field imaging (NFI) capacitive system or an X-Y array, such as is used in a through-glass discrete button, as an alternative to the current sensing capacitive system described with reference to FIGS. 3-9 below.

Contact point 14 may be configured to be activated by a touch, typically from a user. Contact point 14 may be a touch sensor, proximity sensor, or other device or object that may receive input or other means for generating a touch signal in the touch system. Contact point 14 may take the form of an object whose function is apparent to the user, or may take a form that is less visible to the user and/or less apparent as to its functionality in the touch sensor system. Contact point 14 is typically electrically connected to the touch system and may be positioned in the touch system at a separate location from the touch sensor 12. When contact point 14 and touch sensor 12 are physically separated, it may be easy to distinguish between touch signals generated by each contact point and the touch sensor. Physical separation of these components may also be advantageous for certain applications of the present invention, such as a multi-user game.

An example of positioning contact point 14 and touch sensor 12 at separate locations from each other includes placing the contact point in one housing and placing the touch sensor in a separate housing. In this arrangement, the contact point and touch sensor may still be electrically connected to each other and to the touch system with, for example, a wire or cord. In a second example, contact point 14 and touch sensor 12 are each positioned within the same housing, but are physically separated from each other in a way that they do not share the same substrate. In this second example, the contact point and touch sensor may also be electrically connected to each other and to the touch system.

Contact point 14, in an alternative embodiment, may be positioned on the same surface, screen, conductive surface, or the like as touch sensor 12. According to this alternative embodiment, contact point 14 would be at a location on touch sensor 12 that is permanently or temporarily inactive for the purposes of generating a response in the system due to a touch input at that location, but would create a touch signal that is unique to the contact point. As a result, a touch signal from contact point 14 can be distinguished from a touch signal from touch sensor 12 even though they are both positioned on the same surface or screen. Thus, information from the area of the contact point may be used to determine a position of a touch to an active area of the touch sensor and/or to determine a system instruction due to the reported touch. For example, touching the contact point area may provide "enhancement" of the touch signal generated by touching the touch sensor so that a threshold signal is attained for the system (for example, necessary for a given function of the system), or that a signal-to-noise ratio of the system is increased so that the system may more accurately determine the position of a touch to the touch sensor. One means of distinguishing between touches to touch sensor 12 and contact point 14 in this alternative embodiment would be to require that either the touch down events or the lift off events from the touch sensor and contact point are timed separately. As a result, the system may be able to determine which touch signal was generated first, determine the general position of each of those touches (for example, within or outside an "active" area set aside for the touch sensor), and subtracting the touch signal from either the touch sensor or the contact point from the total touch signal generated in the system in order to accomplish an objective of the touch system.

Touch system 10 may also include a processor 16 that is electrically connected to touch sensor 12 and contact point 14. Processor 16 may gather information from touch sensor 12 and contact point 14. Processor 16 may be able to distinguish the identity of the signals, the magnitude of the signals, the timing of the signals being created, as well as other information related to touch sensor 12 and contact point 14. Processor 16 may then process the information as gathered and generate an output, for example, instructions or a particular action for the touch system.

Touch system 10 may also include a power source 18 that provides power to the system. Power source 18 may typically be a voltage source, the output from which being at a level that correlates with the requirements of the touch system.

Figure 2:
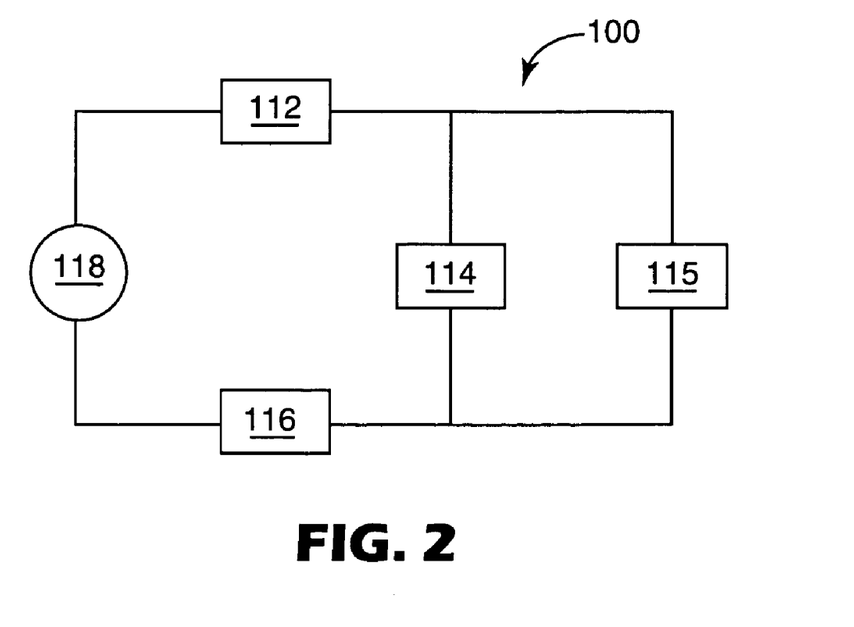
FIG. 2 is a schematic diagram including the features of an alternative embodiment of a touch system, according to the invention.

In another embodiment of the invention, touch system 100 includes a touch sensor 112, a first contact point 114, a second contact point 115, a processor 116 and a power source 118, as shown in the schematic diagram of FIG. 2. Touch sensor 112 is configured to receive a touch that generates a touch signal. Touch sensor 112 may be one of a variety of touch sensors, such as a touch sensor for force, infrared, resistive, surface acoustic wave, or capacitive touch system technology. Contact points 114 and 115 may be activated by a touch that generates a touch signal in the touch system. Contact points 114 and 115 are typically electrically connected to touch system 100 and the system may be able to distinguish between touches to the contact points. Touch system 100 may also include processor 116 that gathers information from the touch sensor 112 and contact points 114 and 115. Typically, the position of a touch to touch sensor 112 cannot be determined until at least one or both of contact points 114 and 115 are also activated. Processor 116 is able to identify, measure the magnitude of, and determine the sequential order of information from touch sensor 112 and contact points 114 and 115. The system may also be able to distinguish between a touch by a user A to contact point 114 and a touch by a user B to contact point 115 by uniquely driving each user through their respective contact point. Touch system 100 may be powered by a power source 118 that "drives" touch sensor 112 and/or contact points 114 and 115 with power, such as with a voltage source.

Figure 3:
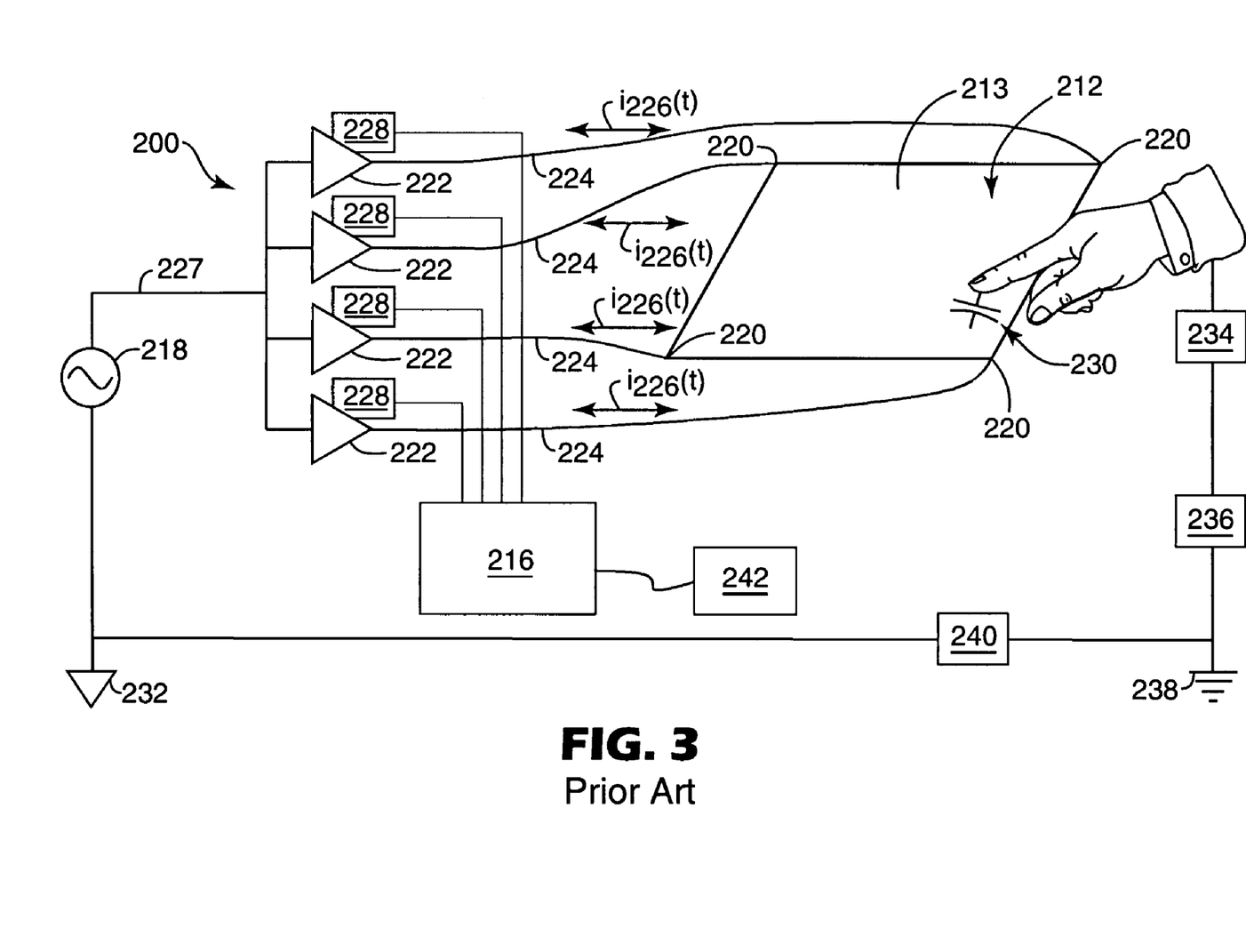
FIG. 3 is a schematic drawing of a touch system of the prior art.
Figure 4:
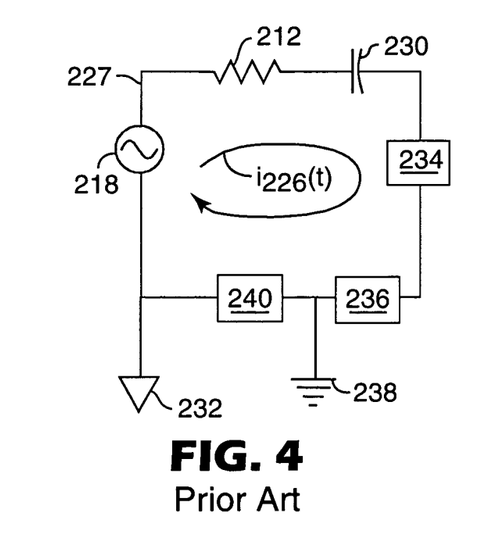
FIG. 4 is a schematic circuit representation of a touch system of the prior art.

A capacitive touch system 200 is illustrated in the schematic drawing of FIG. 3. Touch system 200 includes touch sensor 212, processor 216, power source 218, conductive surface 213 on touch sensor 212, electrodes 220, amplifiers 222, and wires 224 that connect the amplifiers to the touch sensor 212. Touch system 200 also includes current measuring devices 228 that measure currents 226 from touch sensor 212, voltage 227, capacitance 230 between the user and the touch sensor 212, ground 232, body impendence 234 from a user, body-to-ground impedance 236, earth ground 238, system impedance 240, and central processing unit (CPU) 242. An approximate circuit representation including some components of touch system 200 is included as FIG. 4.

Typically, electrodes 220 are bonded to and electrically connected with conductive surface 213. Electrodes 220 serve two purposes: first, they connect the conductive surface to amplifiers 222 through wires 224; and second, the electrodes are arranged around the edge of conductive surface 213 in a pattern that distributes the current flowing in the conductive surface in a linear, orthogonal flow. The construction of capacitive sensors in electrode patterns is known to those skilled in the art, as disclosed in U.S. Pat. Nos. 4,198,539 and 4,371,746, both to Pepper, Jr.

System 200 also includes power source 218 that produces a time varying signal v(t). This signal may be a sine wave, square wave, or any time varying voltage. Amplifiers 222 drive the signal to each of the corners of conductive surface 213 through wires 224. The voltage v(t) is driven from the output of each of amplifiers 222, so the entire surface of touch sensor 212 is at a uniform voltage. Current measuring devices 228 measure currents 226 that flow through the amplifier outputs. When conductive surface 213 is touched by, for example, a finger, capacitive contact is made and is represented by capacitor 230. Current flows from ground 232, through amplifiers 222, conductive surface 213, touch capacitor 230, through body impedance 234 and body to ground impedance 236, and from earth ground 238 through system impedance 240. Currents measured by devices 228 are converted into digital format and processor 216 calculates a position of a touch to touch sensor 212 using ratios of the current 226 generated from a touch to touch sensor 212. Processor 216 may send position information to a CPU 242 for further processing.

If the touch system 200 is connected directly to a grounded wall outlet, impedance 240 may be close to zero. If the touch system 200 is within a small device, such as a battery-powered device with an insulating plastic case, impedance 240 may be very high, which will limit the current flow. Limited current flow in this situation also limits performance and sensitivity of touch system 200.

Figure 5:
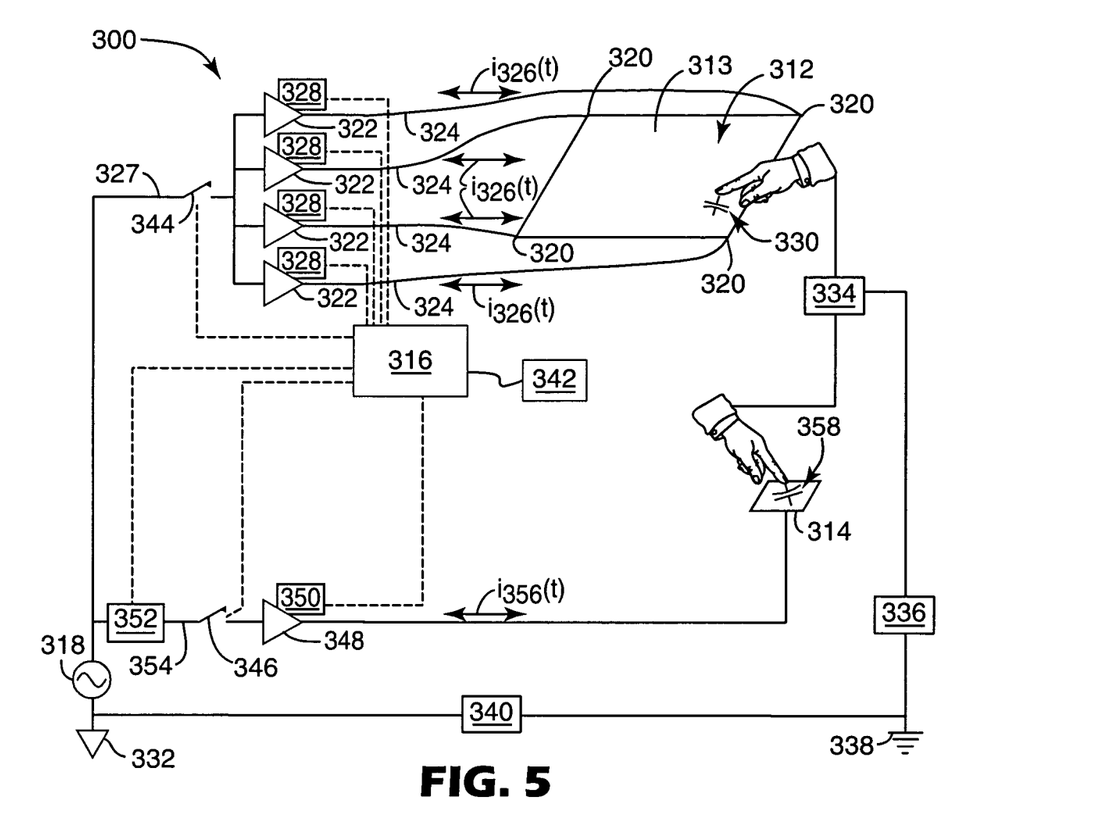
FIG. 5 is a schematic drawing of a touch system, according to the invention.
Figure 6:
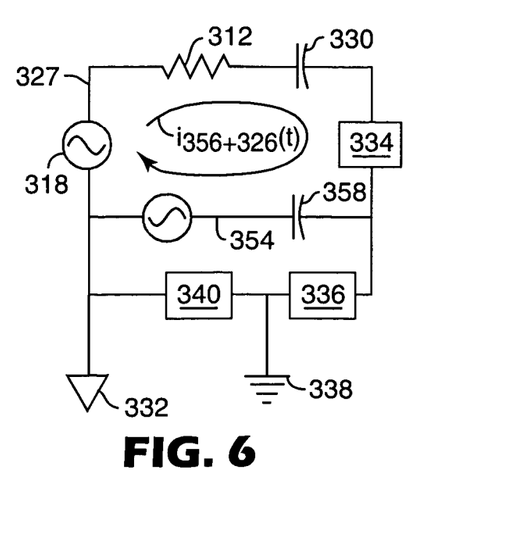
FIG. 6 is a schematic circuit representation of the touch system of FIGS. 1 and 5, according to the invention.

One embodiment of a capacitive touch system is the touch system 300 shown in the schematic drawing of FIG. 5 and generally described with regard to FIG. 1. Capacitive touch system 300 includes touch sensor 312, contact point 314, processor 316, power source 318, conductive surface 313 of touch sensor 312, and electrodes 320 electrically coupled to touch sensor 312. Touch system 300 also includes amplifiers 322, wires 324 connecting amplifiers 322 to touch sensor 312, system currents 326, voltage 327 from power source 318, current measuring devices 328, touch capacitance 330, local ground 332, body impedance 334, body-to-ground impedance 336, earth ground 338, system impedance 340 and CPU 342. Touch system 300 further includes several features different from the prior art, including touch sensor switch 344, contact point switch 346, amplifier 348 for contact point 314, current detector 350, signal adjuster 352, contact point voltage 354, contact point current 356, and contact point capacitance 358. Switches 344 and 346 and touch sensor 314 make it possible for touch system 300 to function in several modes, whereas touch system 200 can function in only one mode. In a first mode, touch system 300 functions in the same way as prior art capacitive touch system 200. However, in alternative user-selectable modes, touch system 300 is able to overcome many of the shortcomings found in prior art touch systems. Touch system 300 also includes amplifier 348 that drives touch pad 314, and output current 356 from contact point 314 is measured by current measuring device 350.

As discussed above, a "touch" to touch sensor 312 or contact point 314, as referred throughout this application, may include an actual physical touch, such as by a user's finger or another object held by the user, or may be defined as a "proximity" touch that creates a touch signal within the circuit without actually physically touching the touch sensor or contact point. Contact point 314 may be designed as a button, a mouse, a joystick, a glove, a switch or other device that may be "activated" by user contact or proximity in order to create a "touch" signal that may be processed by processor 316.

Table 1 indicates some possible operating modes of the touch system 300 of FIG. 5. Modes of operation 1-3 depend on the state of switches 342 and 344 and on the relationships of voltages 327 and 354, the sensitivity of current detectors 328 and 350, and on the algorithms performed by processor 316 and by CPU 342. In an alternative embodiment, the modes of operation may depend on the frequency or the phase of voltage 327 and 354 and the frequency or phase sensitivity of current detectors 328 and 350. A touch system utilizing phases will be described throughout the remainder of the specification.

TABLE 1

Touch System with Touch Sensor and One Contact Point

| Mode | What is Powered | Circuit configuration (refer to FIG. 5) | | Sensor Sensitivity and Responsiveness (refer to FIG. 5) | |
|---|---|---|---|---|---|
| | | Switch 344 Phase of 328 | Switch 346 Phase of 350 | | |
| | | Phase of 327 | Phase of 354 | Touch Sensor 312 | Contact Point 314 |
| 1 | Touch Sensor 312 | Closed 90° 0° | Open 270° DC | Any Touch | Must also touch Contact Point 312 |
| 2 | Contact Point 314 | Open 270° DC | Closed 90° 0° | Must also touch Contact Point 314 | Any Touch |
| 3 | Touch Sensor 312 and Contact Point 314 | Closed 90° 0° | Closed 270° 180° | Any touch; (More sensitive if Contact Point 314 is also touched) | Any touch; (More sensitive if Touch Sensor 312 is also touched) |

In a first mode of touch system 300 (mode 1), any touch to touch sensor 312 is detected and located, and a touch to contact point 314 is detected only if touch sensor 312 is also being touched or a touch signal from sensor 312 has been generated. Switch 344 has been closed so that time varying voltage 327 from power source 318 is connected to amplifiers 322, which may be unity gain amplifiers. Touch sensor 312 is driven with the time varying voltage 327 such that a touch to conductive surface 313 will cause current 326 to flow through touch sensor 312, touch capacitance 330 to the body of the user touching surface 313, body impedance 334, body-to-ground impedance 336, earth ground 338, system impedance 340, local ground 332, and back to amplifiers 322. Touch sensor current 326 and contact point current 356 are measured by current measuring devices 328 and 350, respectively.

Processor 316 collects information from current measuring devices 328 and 350 and calculates a touch position of a touch to touch sensor 312 based on the ratio of currents 326. Current measurements 326 and 356 are used to detect touches to contact point 314 and touch sensor 312. Current measurements 326 and 356 may also be used by a processor 316 to determine the sequence of touches to touch sensor 312 and contact point 314, the duration of those touches, the magnitude of those touches, and other information that might be useful for activating or providing instructions to touch system 300 for a user utilizing touch system 300. The system may also be configured to continuously measure the position of signals from touch sensor 312 and contact point 314 in order to determine the time of touch down or lift off. In this configuration, it is possible for contact point 314 to be included on the same sensor as touch sensor 312, so long as the signal generated by the contact point 314 is different or distinguishable from the signal of touch sensor 312.

Touch system 300 may also include a phase or frequency shifter 352 that adjusts the relationship of voltage 354 relative to voltage 327, while maintaining a constant waveform of voltage 327. Typically, the phase of voltage 354 is set to be distinguishable from voltage 327 by a certain amount in order to maximize the net voltage between touch sensor 312 and contact point 314, for example, by 180°. Table 1 includes examples of various phase shifts in a typical phase setting according to the invention. Signal adjuster 352 may also change the magnitude of voltage 354 relative to voltage 327. Amplifiers 322 and 348 typically have negligible phase shifts or frequency shifts. Current measuring devices 328 and 350 may make current measurements in a variety of ways, including incorporating a synchronous demodulator in order to detect the phases of currents 326 and 356.

The detection phases of devices 328 and 350 may be individually adjustable. In mode 1, the detection phase of devices 328 are typically set to detect capacitively coupled current from the source (touch sensor 312) to ground (ground 332). Touch current is largely capacitively coupled, and is typically shifted from voltage 327 by 60° to 80°. The phase difference can be as little as 300 in cases where impedance 336 and 340 are largely resistive. For purposes of example in this disclosure, multiples of 90° phase shifts will be used. In a preferred embodiment of mode 1, the detection phase of device 350 is set to [voltage 327+270°]. Device 350 detects capacitively coupled current flowing from touch sensor 312 to contact point 314. In alternative embodiments implementing a frequency sensitive circuit, various standard increments in the magnitude of the voltage frequency may be used to distinguish the signals generated by touch sensor 312 and contact surface 314.

In a second mode of touch system 300 (mode 2), a touch to contact point 314 is detected, and a touch to touch sensor 312 is then detected. Switch 346 is closed in this mode so that voltage 354 is conveyed through amplifier 348 to contact point 314. Switch 344 is open so that amplifiers 322 are not powered by voltage 327, thus allowing touch sensor 312 to have a zero time-varying signal. As a result, a touch to touch sensor 312 while not touching contact point 314 results in no measurable signal and no touch is detected by system 300. Signal adjuster 352 may modify the voltage phase or voltage frequency of voltage 354 so that the phase or voltage is distinct from the phase or voltage of voltage 327. Preferably, in a phase sensitive circuit, the phase of current measuring devices 322 is set at 90°.

When contact point 314 is touched, current 356 flows from local ground 332, through amplifier 348, contact point 314, touch capacitance 358, and through the user's body impedance 334. Current 356 may follow two separate paths after passing through body impedance 334. If the user touches only contact point 314, then current 356 flows through the user's body-to-ground impedance 336, to earth ground 338, system impedance 340, and back to local ground 332. Current 356 resulting from the touch to contact point 314 is measured by current measuring device 350. This measurement is conveyed to processor 316 that is configured to detect a touch to contact point 314 based on the change of current 356. Processor 316 may convey this change in current to CPU 342, and CPU 342 may use this information to trigger changes in a program, change the image on a display, or give other instructions that might be required for proper use and function of touch system 300. For example, a touch to contact point 314 may indicate that one user of touch system 300, for example in a video game scenario, is ready to play the video game. In response, CPU 342 may change an indicator on the display from red to green to indicate that the user is now able to participate.

If the user touches contact point 314 and touch sensor 312 simultaneously, or if there are overlapping touches, a portion of current 356 also flows from the user's body, through touch capacitance 330 to touch sensor 312. Current 356 is distributed to amplifiers 322 based on the touch location to touch sensor 312, and then flows back to local ground 332. As current 356 passes through amplifiers 322, it will be measured by current measuring devices 328, and the measurements will subsequently be conveyed to processor 316. Thus, a touch to touch sensor 312 can be detected and then the position of that touch measured, only if the user is simultaneously touching contact point 314 and touch sensor 312. It is noted, however, that a path for return of the current provided by touching contact point 314 and touch sensor 312 may increase the current being channeled through touch sensor 312. As such, the higher amount of current may increase the amount of signal being sent to processor 314 while the amount of "noise" in the system remains constant. As a result, the signal-to-noise ratio of the current measurements and the resulting position measurements may be increased.

In a third mode of the touch system (mode 3), touch sensor 312 and contact point 314 are both driven with voltage signals, preferably by closing switches 344 and 346. A touch to touch sensor 312 alone may be detected and measured, as will a touch to only contact point 314. Signal adjuster 352 may adjust the phase or frequency of voltage 354 to be distinguishable from voltage 327. In the case of a phase sensitive touch system, voltage 354 is preferably out of phase with voltage 327 by 180°.

A benefit of mode 3 is improved signal-to-noise ratio for touch signals on touch sensor 312, if a user simultaneously touches or is in proximity with contact point 314. Signal-to-noise ratios are affected in at least two ways. First, touching a contact point 314 while touching touch sensor 312 provides a local ground path for touch current, as illustrated in the schematic circuit drawing of FIG. 6. Second, in addition to touch current flowing from touch capacitance 330, through a user's body impedance 334 into earth ground 338, and through system impedance 340 to local ground 332, current may also flow from sensor capacitance 330, through a user's body impedance 334, through contact point capacitance 358, amplifier 348 and into local ground 332. Accordingly, a higher signal is provided to touch sensor 312, and the sensitivity of touch sensor 312 is enhanced. Sensitivity of touch sensor 312 is enhanced in part when earth ground 338 is bypassed when a user is touching both contact point 314 and touch sensor 312, when voltage 354 is passed through contact point 314 and the user to touch sensor 312, or a combination of these effects on system 300. This is especially true where system impedance 340 is high, as in the case with ungrounded battery operated equipment, causing a high percentage of current 340 to pass through touch sensor 312 rather than back to system ground 332.

Figure 7:
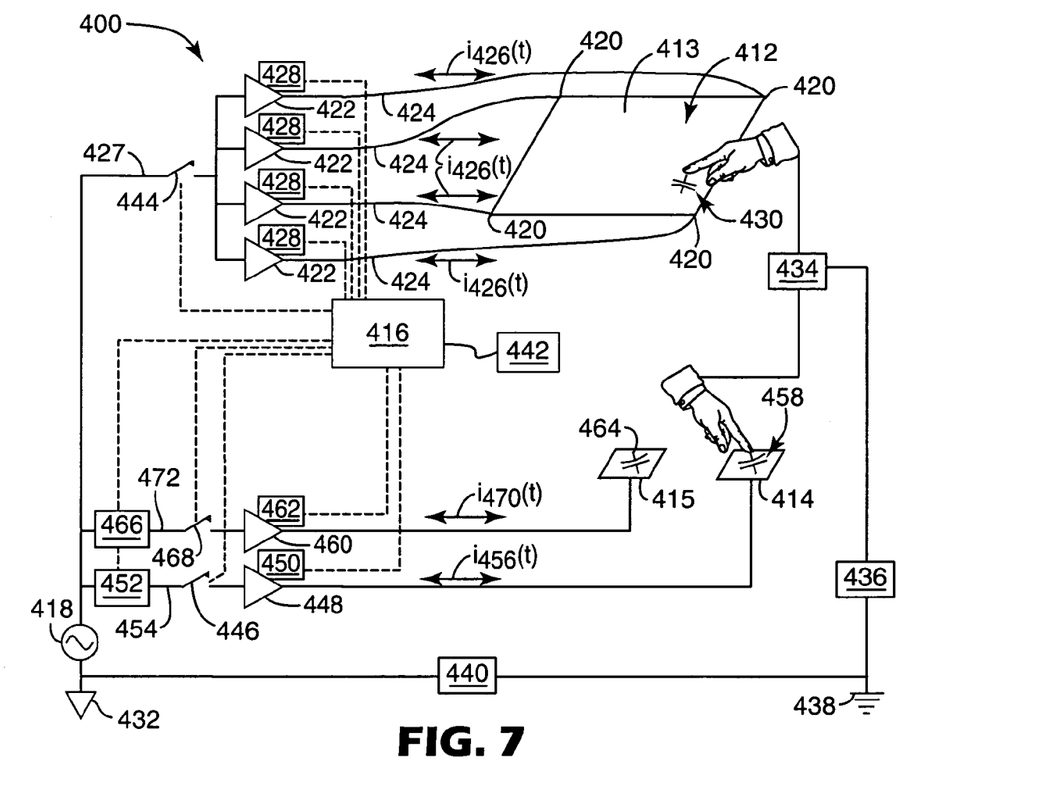
FIG. 7 is a detailed representation of the touch system embodiment of FIG. 2, according to the invention.
Figure 8:
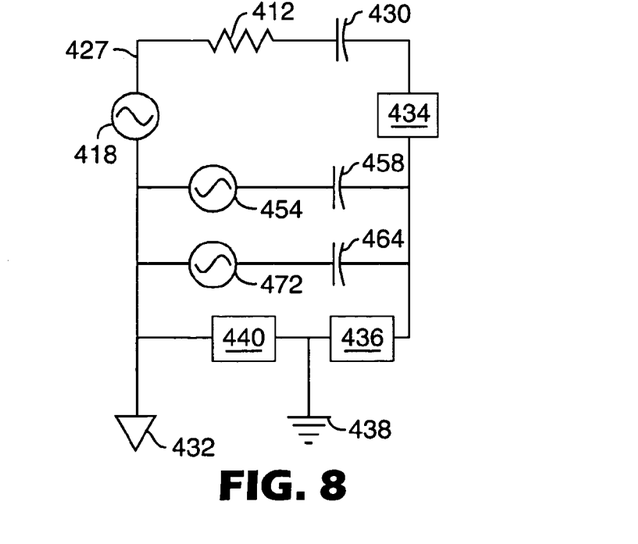
FIG. 8 is a schematic circuit representation of the touch system of FIGS. 2 and 7, according to the invention.

An alternative embodiment of the touch system of the present invention illustrated in FIG. 2 is described in further detail according to the more detailed schematic drawing of touch system 400 illustrated in FIG. 7. Touch system 400 is a capacitive touch system that operates with many of the same features and functions as the touch system of FIG. 5. Like features are described with the same reference numbers. In addition to the features of FIG. 5, touch system 400 further includes an additional contact point 415, amplifier 460, current measuring device 462, contact point touch capacitance 464, signal modifier 466, contact points switch 468, contact point current 470 and contact point voltage 472. An approximate circuit representation including some components of the touch system of FIG. 7 is illustrated in FIG. 8.

Touch system 400 may operate in any of several user-selectable modes that overcome the technology limitations found in prior art systems. Some of the details related to a capacitive touch system of touch system 400 are presented in Table 2.

TABLE 2

Operating Modes for Touch System with Touch Sensor and Two Contact Points

| | | Circuit configuration (refer to FIG. 7) | | | Sensor Sensitivity and Responsiveness (refer to FIG. 7) | | |
|---|---|---|---|---|---|---|---|
| Mode | What is Powered | Switch 444 Phase of 428 Phase of 427 | Switch 446 Phase of 450 Phase of 454 | Switch 468 Phase of 462 Phase of 464 | Sensor 11a | Pad 52 | Pad 53 |
| 1 | Touch Sensor 412 | Closed 90° 0° | Open 270° DC | Open 270° DC | Any touch | Must touch Touch Sensor 412 | Must touch Touch Sensor 412 |
| 2 | Contact Point 414 | Open 90° 0° | Closed 270° 180° | Open 90° DC | Must touch Contact Point 414 | Any touch | Must touch Contact Point 414 |
| 3 | Contact Point 415 | Open 90° 0° | Open 90° DC | Closed 270° 180° | Must touch Contact Point 415 | Must touch Contact Point 415 | Any touch |
| 4 | Contact Points 414 and 415 | Open 270° & 180° 0° | Closed 270° 180° | Closed 180° 90° | Must touch Contact Point 414 or 415 | Any touch | Any touch |
| 5 | Touch Sensor 412 and Contact Points 414 and 415 | Closed 90° 0° | Closed 270° 180° | Closed 270° 180° | Any touch | Any touch | Any touch |

In a first mode of touch system 400 (mode 1), touch system 400 operates in the same way as prior art capacitive touch screens, such as touch system 200. According to this mode, switch 444 is closed and switches 446 and 468 are left open. As a result, touch sensor 412 is activated by a touch and processor 416 is able to determine the location of a touch to touch sensor 412 (see mode 1 of touch system 300 for further details).

In a second mode of touch system 400 (mode 2), similar to mode 2 of touch system 300, switch 446 is closed and switches 444 and 468 are open. A touch to contact point 415 or touch sensor 412 can be detected and measured only if the user is simultaneously touching or creates an overlapping touch with contact point 414. Switch 446 is closed so that voltage 454 is conveyed through amplifier 448 to contact point 414. Switches 444 and 468 are open so that amplifiers 422 and 460 have DC voltages and touch sensor 412 and contact point 415 have zero time-varying signal. As a result, a touch to touch sensor 412 or contact point 415 while not touching contact point 414, results in no measurable signal and no touch to touch sensor 412 is detected. Signal modifier 452 modifies the phase or frequency of voltage 454 so that voltage 454 is distinguishable from voltages 427 and 464. Preferably, in the case of a phase sensitive touch system, the phase of current measuring devices 428 and 462 are set 1800 from the phase of current measuring device 450.

If the user of touch system 400 simultaneously touches contact points 415 and 414 and touch sensor 412, a portion of current 456 may flow from the user's body, through touch capacitance 430 to touch sensor 412, to amplifiers 422 and back to local ground 432, or current 456 may flow through touch capacitance 464 of contact point 415, through amplifier 460 and back to local ground 432. As current 456 flows through either of amplifiers 422 or 460, it will be measured by current measuring device 428 or 462, and measurements will be conveyed to processor 416. Thus, as a touch on touch sensor 412 or contact point 415 may be detected and measured only if the user is simultaneously touching contact point 414. It is noted that a return path for the current provided by touching contact point 414 and touch sensor 412 or contact point 415 will generally increase the current being measured and thus increase the signal-to-noise ratio of the current measurements and the resulting signal collected by the processor. This is especially true where impedance 440 is high.

In a third mode of touch system 400 (mode 3) that is similar to mode 2, contact point 415 is activated or made available for activation by closing switch 468. A touch on contact point 414 or on touch sensor 412 can be detected and measured only if the user is simultaneously touching contact point 415. A touch to contact point 415 can also be detected independent of touching contact point 414 or touch sensor 412. In mode 3, switches 444 and 446 are open so that amplifiers 222 and 448, and thus touch sensor 412 and contact point 414, have DC signals. As a result, a touch to only touch sensor 412 or contact point 414 while not touching contact point 415 results in no measurable signal and no touch is detected. When switch 468 is closed, voltage 464 is conveyed through amplifier 460 to contact point 415, and current 470 is measured by current measuring device 462.

In one embodiment of touch system 400, two users can use the touch system simultaneously if processor 416 is programmed to switch or toggle rapidly between modes 2 and 3. If a first user touches contact point 414 continuously and a second user touches contact point 415 continuously, the touch coordinates of each user touching touch sensor 412 can be measured because the signals generated by each user on touch sensor 412 are distinguishable from each other. According to this embodiment, processor 416 first configures switches 444, 446 and 468 to mode 2, activating contact point 414 with a signal equal to voltage 454. The presence of the first user is detected by current change through contact point 414, resulting from capacitive contact 458 with the first user. When the first user touches touch sensor 412, a connection with voltage 454 via amplifier 448 to contact point 414 causes current 456 to flow through the first user's body and into touch sensor 412. The position of the first user is measured from the distribution of current through electrodes 420, current measuring devices 428 and amplifiers 422. If the second user is touching touch sensor 412 during this time, the capacitive coupling of the second user's body will have a negligible effect on currents 456 flowing from the first user into touch sensor 412, because the current from the first user's body generates negligible voltage on the surface of touch sensor 412. After measuring the first user's position, processor 416 changes or toggles from mode 2 to mode 3, thus deactivating contact point 414 and activating contact point 415 with voltage signal 464. The presence of the second user is detected by a current change through contact point 415 that results from capacitive contact with the second user. When the second user touches touch sensor 412, a connection with voltage 464 via amplifier 460 to contact point 415, causes current 470 to flow through the second user's body and into touch sensor 412. The touch by the second user to touch sensor 412 is measured from the distribution of current in touch sensor 412. Measuring both the first and second user's position by switching or toggling from mode 2 to mode 3 and from mode 3 to mode 2 can be repeated at a rapid rate of, for example, 5 milliseconds per mode. This will result in the perception of simultaneous detection, even in situations where touch down and lift off are rapid by human standards. While this embodiment shows a useful two-user device with two contact points 414 and 415, it is readily expandable to more than two users by the addition of more contact points and their associated circuitry.

In addition to the sequenced multi-user system as described above, current flowing from one contact point to another contact point can be used as an indication of a unique condition. If, for example, two users are touching their respect contact points in a given application, such as a two person competitive video game, and a first user touches a second user, current will flow from one contact point through the first user's body, the second user's body, and into the contact point of the second user. At any given point in the above example, one contact point has voltage applied to it so that it can provide a current when the user associated with that pad touches the touch screen, while the other contact point is inactive with no voltage and should have no current flow. If current for a given pad is detected in the inactive pad, it is an indication that the two users are touching one another. This can be used in a game or other application as an "interference" or "foul" indicator.

Another example of an application of the present invention is with automobile navigation systems. Automobile navigation systems may have touch screens that use the principles of modes 2 and 3. Automotive manufacturers have begun using video displays with touch screens on navigation systems where the system interface may be too complex for buttons and dials alone. Navigation system may also be too complex to use while actively driving the vehicle. One solution is to disable the driver's touches from registering on the navigation system while the car is in motion, but allow a passenger to use the navigation system at any time. It may also be desirable to allow any passenger to use the navigation system, or only the passenger sitting in one of the front seats. Disabling a touch of one or more passengers from registering on the navigation system may be accomplished by implanting contact points or similar sensors in one or more of the vehicle seats. When a user creates a touch signal in the contact point by sitting in or being proximate to a seat, the touch system will react according to the system's program settings to allow or disallow touches from that user to register on the navigation system.

In a fourth mode of touch system 400 (mode 4), that is similar to modes 2 and 3, both contact points 414 and 415 are activated, preferably by closing switches 446 and 468. A touch on touch sensor 412 can be detected and measured only if the user is simultaneously touching or has activated contact point 414 or 415 and touch sensor 412. A touch to contact point 414 or 415 can also be detected independently of touching touch sensor 412. In mode 4, switch 444 is open so that amplifiers 422 and touch sensor 412 have DC voltage signal at their outputs and no signal is generated by a touch to touch sensor 412. Switches 446 and 468 are closed so that contact point 414 and 415 are driven with a time varying signal by amplifiers 448 and 460. A touch to contact point 414 will couple voltage 454 on contact point 414 to the user's body impedance 434 through touch capacitance 458, causing current 456 to flow through current measuring device 450, contact point 414, coupling capacitance 458, the user's body impedance 434, body-to-ground impedance 436, system impedance 440, local ground 432, and amplifiers 422 as the current flows back to touch sensor 412. Processor 416 measures the change in current 456 and determines if the change in current is above a defined threshold or meets specified signal requirements. If defined requirements are met, a touch to contact point 414 is registered and may be communicated from processor 416 to CPU 442.

Mode 4 has an important difference from other modes of touch system 400 in that current measurement circuits 428 may each use a phase sensitive or frequency sensitive demodulator that measures two separate phases or frequencies, for example, phases that are 90° apart. Also, signal modifiers 452 and 466 may be set to generate voltages 454 and 464 at separate phases or frequencies, for example, phases that are 90° apart so that the phase sensitive demodulator 428 may detect currents resulting from a user touching contact point 414 or 415 and touch sensor 412. With these phase or frequency settings, current measuring devices 428 are able to yield simultaneous detection of touches to contact points 414 or 415 and a position measurement of a touch to touch sensor 412.

In fifth mode of touch system 400 (mode 5), touch sensor 412 and contact points 414 and 415 are all driven with time varying voltage signals, preferably by closing switches 444, 446 and 468. A touch to touch sensor 412 alone may be detected and measured, as will a touch to only contact points 414 or 415. Signal modifiers 452 and 466 may adjust the phase or frequency of voltages 454 and 464 to be distinguishable over each other and voltage 427, for example, by 180° out of phase with voltage 427 and 90° out of phase with each other.

A benefit of mode 5 is improved signal-to-noise ratio for touch signals generated on touch sensor 412, if the user simultaneously touches contact points 414 or 415. Signal-to-noise ratios are affected in at least two ways: first, touching a contact point 414 or 415 while touching touch sensor 412 provides a local ground path for touch current (as illustrated in the schematic circuit of FIG. 8); and second, in addition to touch current flowing from touch capacitance 430, through a user's body impedance 434, into earth ground 438, system impedance 440, body-to-ground impedance 436, and local ground 432, current may also flow from touch capacitance 430, through a user's body impedance 434, contact point touch capacitance 458 or 464, amplifier 448 or 460, and into local ground 432.

Figure 9:
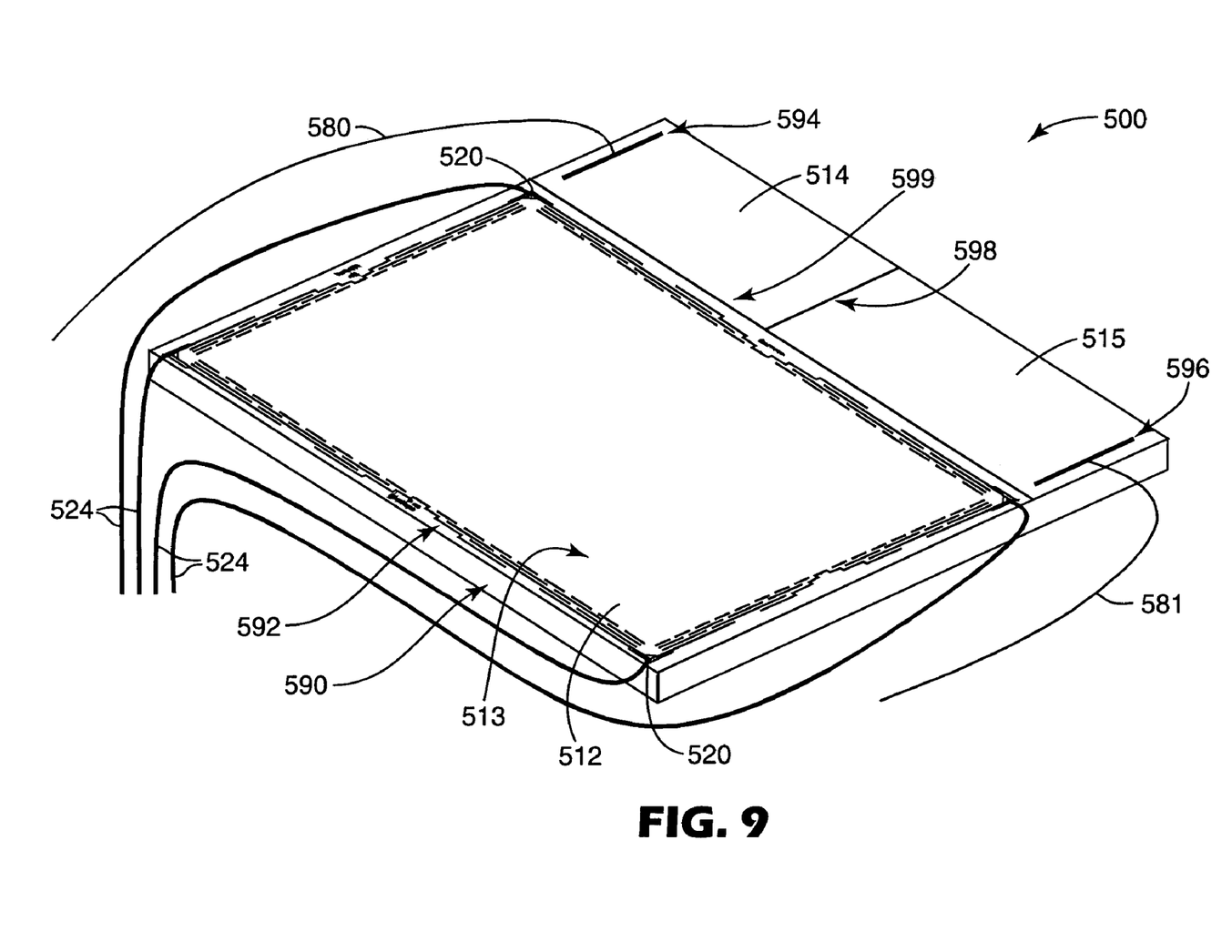
FIG. 9 is a perspective view of a touch system according to the invention where the touch sensor and contact point are mounted on the same substrate.

Another embodiment is where the contact point is adjacent to, and still separate from, the sensor. One example is a touch system 500 that includes a touch sensor 512 and conductive contact points 414 and 415 constructed onto a single substrate 590 that is coated on its top surface with conductive material, as illustrated in FIG. 9. A linearization pattern 592 of conductive material, such as silver frit or conductive ink, is printed around the border of touch sensor 512. Wires 524 and electrodes 520 may connect to pattern 592 at the four corners of touch sensor 512. Drive amplifiers, such as amplifiers 422 illustrated in FIG. 7, may be used to power conductive surface 513 of touch sensor 512. Contact points 514 and 515 may connect to drive amplifiers, such as amplifiers 448 and 460 in FIG. 7, through wires 580 and 581 that are connected to conductive electrodes 594 and 596. Contact points 514 and 515 and touch sensor 512 are electrically isolated from each other by isolation lines 598 and 599. Isolation lines 598 and 599 may be formed by selectively etching away the conductive material on the surface of substrate 590 or by other methods such as laser ablation.

In another embodiment of a capacitive touch system, such as touch system 400, a second touch sensor may replace one or both of contact points 414 and 415. In this embodiment, the system may be operated in the same or similar modes as system 300. However, a second or more additional touch sensors would each require multiple amplifiers and electrodes such as amplifiers 422 and electrodes 420 with associated current measuring devices 428 in order to measure and determine a touch to each of those additional touch sensors. An additional touch sensor in a touch system may be used for many purposes, for example, to replace a "mouse" used to operate the system where the location of a touch on the additional touch sensor conveys a right or left mouse button activation or a sliding touch on the additional touch sensor may perform the same or similar function of a mouse scroll. Such a touch system may be configured so that the primary touch sensor, the additional touch sensor, or both or neither touch sensors are functional only when these touch sensors are activated or when an additional contact point is also simultaneously activated.

Contact points may have conductive surfaces or may comprise conductive or resistive materials that are insulated from direct touch by a dielectric material, as is common practice with capacitive touch sensors. To "touch" a contact point, it is only necessary that capacitive contact be made between a user or an object and the conductive material of the contact point, either by physical touching or by proximity touching. It would be possible, for example in a capacitive touch system, to implement contact points into a table by installing conductive foil pads under a surface laminate such as Formica. If the user rests an arm on or close to the table over the foil pad, there would typically be sufficient signal coupled capacitively to the user for detection of the user and for injection of measurable current into a touch sensor or contact point. Alternatively, contact points may be made with a foil sheet or conductive mesh screen that may be placed into or under the fabric of a seat such as an automobile seat (as described above with regard to automobile navigation systems). In another exemplary application, contact points may be made with a foil sheet or conductive plate embedded in the housing of a hand-held personal digital assistant (PDA). A hand-held device such as a PDA is not grounded except for a battery ground, creating a capacitive touch circuit with high impedance. Therefore, powering the touch surface of the PDA through a separate touch pad (the embedded conductive material) may reduce the system impedance, particularly if the contact point is separately powered. An advantage of this embodiment of the invention is that when a touch sensor is powered by simultaneously touching of a contact point or an additional touch sensor, the additional current source provided by the simultaneous touching improves the sensitivity of the system, even if there is only one user involved.

In addition to sensing the presence of a user, a touch on a touch sensor may be selectively enabled. Also, in applications such as the automobile seat or the table where contact points are insulated from the user by a dielectric material, it is advantageous to drive a contact point with the highest feasible voltage so that the touch current is maximized. Contact points may be driven with high voltage while touch sensor drivers use low voltage, or vice versa.

Typical magnitudes of electrical parameters for the touch systems described above, using features of touch system 400 as examples, are: for voltage 427, about 1 to 30 V peak-to-peak at 10 kHz to 200 kHz; for voltage 454, about 1 to 30 V peak-to-peak at 10 kHz to 200 kHz; for voltage 464, 1 to 30 V peak to peak at 10 kHz to 200 kHz; for touch capacitance 430, about 100 to 2000 pf; and for body-to-ground impedance 436, about 50 to 2000 pf with a resistance typically less than about 100Ω if a user makes direct electrical contact with ground 438. Body impedance 434 is typically in the range of about 20 to 300 kΩ. Touch sensor 412 has a surface resistance of about 300 to 3000Ω/□ (ohms per square) having a surface resistance between any two corners of the touch sensor of about 50 to 500Ω. Output impedance of amplifiers 422, 448 and 460 may be about 0.5 to 100Ω. System impedance 440 may be about 1 to 10,000 pf for an isolated touch system. System impedance 440 may have resistance less than 0.001Ω if the touch system is electrically connected to ground.

Many embodiments of the present invention have several practical uses within the field of computer-related games. For example, touch pads may be integrated into a game user's seat, arm rest, joystick, mouse, or the like or be activated by pressing a button or series of buttons that are mounted separately or integrated into the game console or other furniture associated with the game. A computer game may utilize an analog touch digitizer and at least one touch pad where activation of the pad indicates that the user is ready to play or wants to take a time out. A computer game with "foul" detection, as described above, may include indicating when players are touching each other or performing actions that violate game rules, such as users taking turns at touching the touch sensor in a particular order.

As applied to games, the invention may require that the user or users play a game with only one hand because a second hand must maintain contact with a contact point. This feature would help reduce the number of hands that are touching a touch sensor during the course of a game, thus reducing obstructions to view of the touch sensor such as when a touch sensor is integrated into a viewable screen. The invention may also be used to measure the amount of time a user is touching the touch sensor in comparison to the amount of time the touch sensor is available for touching due to activation of a contact point. This feature could be a performance indicator or a method of determining the payment amount in a pay-for-use computer game. The invention may also allow for the computer game to display the amount of time the user is "in play" or otherwise available to register a touch to the touch sensor because of simultaneously touching a contact point. For example, a border or background of a computer game screen may change from red to green when a user is "in play" and may be able to indicate when each of several players is "in play."

As further applied to games, one embodiment of the invention may be configured to allow for playing a team game, for example, each player may have a contact point but only one player is activated at a time to register a touch to the touch sensor. Activation of a different player may be done after an activate player completes a portion of the game, possibly on a fixed time basis or at random times without prior notice. In an alternative team game, each team may include only one contact point and the contact point must be momentarily untouched as players on the same team alternate being "in play." The game may be configured so that all the members of a team may be touching the same or different contact points before any player is "in play."

Throughout the above detailed description of the present invention, emphasis has been placed on utilizing various voltage phases and phase changes to fulfill the objectives of the invention. For example, signal modifiers 452 and 466 may adjust the phase relationship of voltages 454 and 464 relative to voltage 427 and current measuring devices 428, 450 and 462 may make phase sensitive current measuring devices. An alternative to using different voltage phases as a way to distinguish between voltage signals is to use voltage signal frequencies (as mentioned throughout). If frequencies were used for this purpose, frequency adjusters would replace phase shifters and current measuring devices would make frequency sensitive current measurements rather than phase sensitive current measurements.

Where frequency is used to distinguish between signals, it is possible that passing multiple frequencies across a touch sensor may result in a buildup of current in some form on the touch sensor. Such a current buildup can be reduced by filtering off excess current from the touch sensor with a filter, as may be common in the art.

Although the specific features of the invention are shown in some drawings and not in others, this is for convenience only as features may be combined with any or all of the other features in accordance with the invention. The words "including," "comprising," "having," and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

I claim:

1. A data processor for an occupant identification system comprising:
    a driver input module for receiving information from a first contact point associated with a driver position, the first contact point driven with a first signal;
    a passenger input module for receiving information from a second contact point associated with a passenger position, the second contact point driven with a second signal; and
    a position analysis module for distinguishing between the first signal and the second signal.

2. The processor of claim 1 further comprising a safety switching module for disabling the driver input module from receiving information depending on the status of a vehicle.

3. The processor of claim 1 wherein the safety switching module disables the driver input module from receiving information when the vehicle is in motion.

4. The processor of claim 1 wherein the processor receives input from the passenger input module regardless of the status of a vehicle.

5. The processor of claim 1 wherein the first signal is generated by a driver contacting a touch sensor and the second signal is generated by a passenger contacting the touch sensor.

6. The processor of claim 5 wherein the touch sensor is a resistive touch sensor.

7. The processor of claim 5 wherein the touch sensor is activated by user proximity.

8. The processor of claim 5 wherein the first and second contact points are embedded in a vehicle seat.

* * * * *

UNITED STATES PATENT AND TRADEMARK OFFICE
CERTIFICATE OF CORRECTION

PATENT NO.         : 8,159,472 B2                                         Page 1 of 1
APPLICATION NO.    : 12/254339
DATED              : April 17, 2012
INVENTOR(S)        : Bernard Geaghan

It is certified that error appears in the above-identified patent and that said Letters Patent is hereby corrected as shown below:

<u>Title Page</u>
Item (56), References Cited, page 2, line 5 OTHER PUBLICATIONS
       delete "Tedhnology" and insert -- Technology -- therefor.

<u>Column 8</u>
Line 19; delete "300" and insert -- 30° -- therefor.

<u>Column 11</u>
Line 23; delete "1800" and insert -- 180° -- therefor.

Signed and Sealed this
Tenth Day of July, 2012

David J. Kappos
*Director of the United States Patent and Trademark Office*